United States Patent
Cheng et al.

(10) Patent No.: US 12,199,291 B2
(45) Date of Patent: Jan. 14, 2025

(54) ELECTROCHEMICAL CELL WITH BILAYER ELECTROCATALYST STRUCTURE

(71) Applicant: Robert Bosch GmbH, Stuttgart (DE)

(72) Inventors: Lei Cheng, Sunnyvale, CA (US); Morteza Rezaei Talarposhti, Sunnyvale, CA (US); Jonathan Braaten, Sunnyvale, CA (US); Daniil Kitchaev, Brookline, MA (US); Nathan Craig, Sunnyvale, CA (US); Christina Johnston, Spanish Fort, AL (US)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 17/842,029

(22) Filed: Jun. 16, 2022

(65) Prior Publication Data

US 2023/0411638 A1    Dec. 21, 2023

(51) Int. Cl.
| | |
|---|---|
| *H01M 4/92* | (2006.01) |
| *H01M 4/86* | (2006.01) |
| *H01M 4/88* | (2006.01) |
| *H01M 8/1004* | (2016.01) |

(52) U.S. Cl.
CPC ......... *H01M 4/926* (2013.01); *H01M 4/8657* (2013.01); *H01M 4/8825* (2013.01); *H01M 8/1004* (2013.01)

(58) Field of Classification Search
CPC .. H01M 4/926; H01M 4/8657; H01M 4/8825; H01M 8/1004; H01M 4/8605; H01M 2008/1095; Y02E 60/50
See application file for complete search history.

(56) References Cited

U.S. PATENT DOCUMENTS

| | | |
|---|---|---|
| 8,741,503 B2 | 6/2014 | Akita |
| 9,997,794 B2 | 6/2018 | Burlatsky et al. |
| 2011/0020727 A1* | 1/2011 | Burlatsky ............. H01M 4/921 429/483 |
| 2011/0256468 A1 | 10/2011 | Suzuki et al. |
| 2015/0064610 A1* | 3/2015 | Naohara ............. H01M 8/1004 429/535 |
| 2017/0141406 A1* | 5/2017 | Young ................... H01M 4/921 |

OTHER PUBLICATIONS

Gubler, L. et al., "Polymer Design Strategies for Radiation-Grafted Fuel Cell Membranes," Advanced Energy Materials, vol. 4, No. 1300827, 2014, pp. 1-30, DOI: 10.1002/aenm.201300827.

(Continued)

*Primary Examiner* — Daniel S Gatewood
(74) *Attorney, Agent, or Firm* — Brooks Kushman P.C.

(57) ABSTRACT

An electrochemical cell (e.g., a fuel cell) includes an anode layer, a cathode layer, and an electrolyte membrane layer disposed between and spacing apart the anode layer and the cathode layer. The electrochemical cell further includes a functional layer disposed at an interface between the cathode layer and the electrode membrane layer. The functional layer includes a composition including a carbon material, an ionomer material, and optionally an amount of catalyst material.

20 Claims, 5 Drawing Sheets

(56) References Cited

OTHER PUBLICATIONS

Moghadam, F. et al., "Two-dimensional materials: an emerging platform for gas separation membranes," Current Opinion in Chemical Engineering, vol. 20, Feb. 19, 2018, pp. 28-38, DOI: 10.1016/j.coche.2018.02.004.

Stahler, A. et al., "Scalable Implementation of Recombination Catalyst Layers to Mitigate Gas Crossover in PEM Water Electrolyzers," Journal of The Electrochemical Society, vol. 169, No. 034522, Mar. 21, 2022, 10 pages, DOI: 10.1149/1945-7111/ac5c9b.

Atrazhev, V. V. et al., "The potential of catalytic particle in ion exchange membrane," Journal of Electroanalytical Chemistry, vol. 601, No. 1-2, 2007, pp. 251-259, DOI: 10.1016/j.jelechem.2006.11.010.

\* cited by examiner

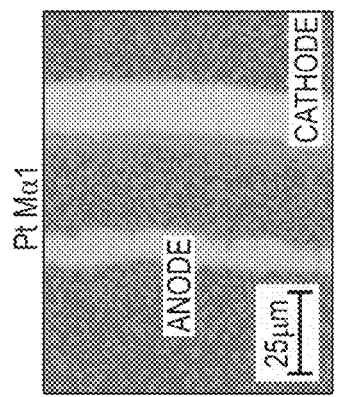
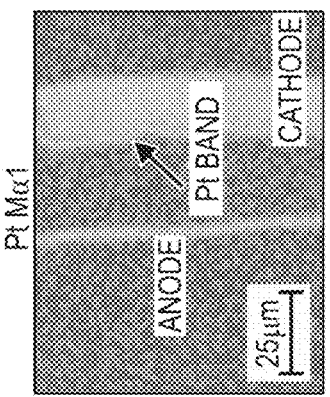
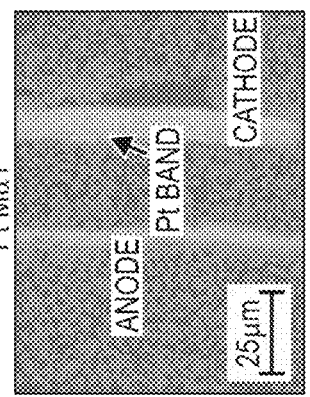
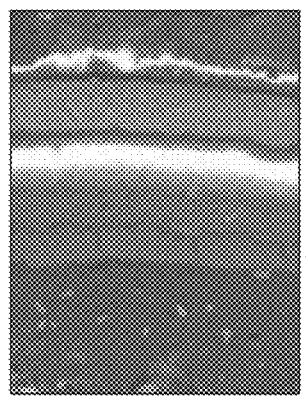
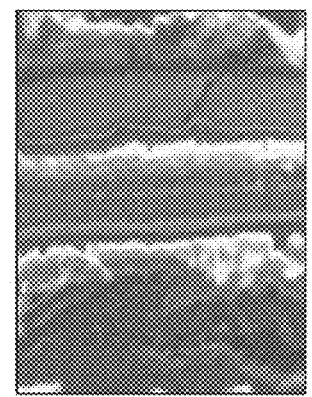
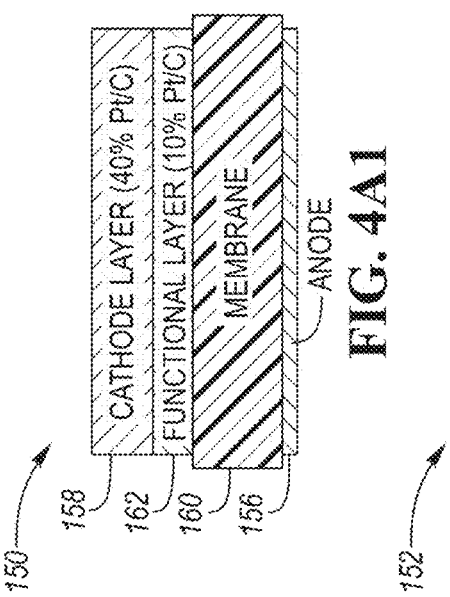
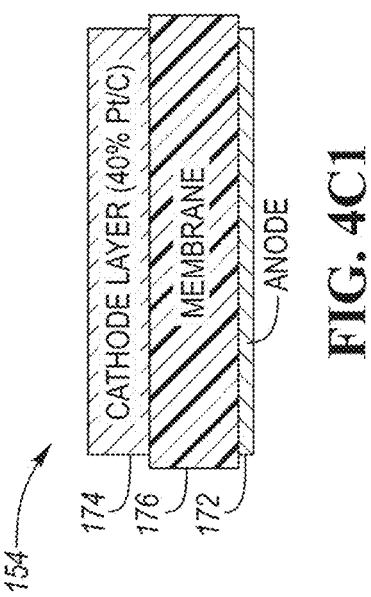

ELECTROCHEMICAL CELL WITH BILAYER ELECTROCATALYST STRUCTURE

TECHNICAL FIELD

The present disclosure relates to an electrochemical cell with a bilayer electrocatalyst structure. The bilayer electrocatalyst structure may include a functional layer having a lower concentration of catalysts particles than the cathode layer.

BACKGROUND

With growing interest in green technologies worldwide, electrochemical cells such as fuel cells and electrolyzers are top candidates for various applications. An electrochemical cell is a device capable of either generating electrical energy from chemical reactions (e.g., fuel cells) or using electrical energy to conduct electro-chemical reactions (e.g., electrolyzers). Fuel cells have shown promise as an alternative power source for vehicles and other transportation applications. Fuel cells operate with a renewable energy carrier, such as hydrogen. Hydrogen fuel cells also operate without toxic emissions or greenhouse gases. An individual fuel cell includes a membrane electrode assembly (MEA) and two flow field plates. An individual fuel cell typically delivers 0.5 to 1.0 V. Individual fuel cells can be stacked together to form a fuel cell stack having higher voltage and power.

Electrolyzers undergo an electrolysis process to split water into hydrogen and oxygen, providing a promising method for hydrogen generation from renewable resources. An electrolyzer, like a fuel cell, includes anode and cathode catalyst layers separated by an electrolyte membrane. The electrolyte membrane may be an ion-conducting polymer, an alkaline solution, or a solid ceramic material. A catalyst material is included in the anode and cathode catalyst layers of the electrolyzer.

One of the current limitations of widespread adoption and use of this clean and sustainable technology is the relatively expensive cost of the fuel cell. A catalyst material (e.g., platinum catalyst) is included in both the anode and cathode catalyst layers of an electrochemical cell. The catalyst material is one of the most expensive components in the electrochemical cell.

SUMMARY

According to one embodiment, an electrochemical cell (e.g., a fuel cell) is disclosed. The electrochemical cell includes an anode layer, a cathode layer, and an electrolyte membrane layer disposed between and spacing apart the anode layer and the cathode layer. The electrochemical cell further includes a functional layer disposed at an interface between the cathode layer and the electrode membrane layer. The functional layer includes a composition including a carbon material, an ionomer material, and optionally an amount of catalyst material.

According to another embodiment, an electrochemical cell (e.g., a fuel cell) is disclosed. The electrochemical cell includes an anode layer, a cathode layer, and an electrolyte membrane layer disposed between and spacing apart the anode layer and the cathode layer. The electrochemical cell further includes a functional layer disposed at an interface between the cathode layer and the electrode membrane layer. The functional layer includes a composition including a carbon material, an ionomer material, a filler material, and optionally an amount of catalyst material.

According to yet another embodiment, a method of fabricating an electrochemical cell is disclosed. The method includes providing a functional layer on an electrolyte membrane layer. The functional layer has a first surface and an opposing second surface on an electrolyte membrane layer. The first surface of the functional layer contacts the electrolyte membrane. The functional layer includes a carbon material, an ionomer material, and optionally a catalyst material. The method further includes providing a cathode material on the opposing second surface of the functional layer to form a cathode layer. The electrolyte membrane layer, the functional layer, and the cathode layer forms a portion of the electrochemical cell.

BRIEF DESCRIPTION OF THE DRAWINGS

FIGS. 4A1, 4B1, and 4C1 depict schematic views of fuel cells according to experimental samples.

FIGS. 4A2, 4B2, and 4C2 depict SEM images of different lab fabricated fuel cells after laboratory accelerated aging protocols.

FIGS. 4A3, 4B3, and 4C3 depict EDS mapping images of platinum (Pt) in different laboratory fabricated fuel cells after laboratory accelerated aging protocols.

DETAILED DESCRIPTION

Figure 1A:
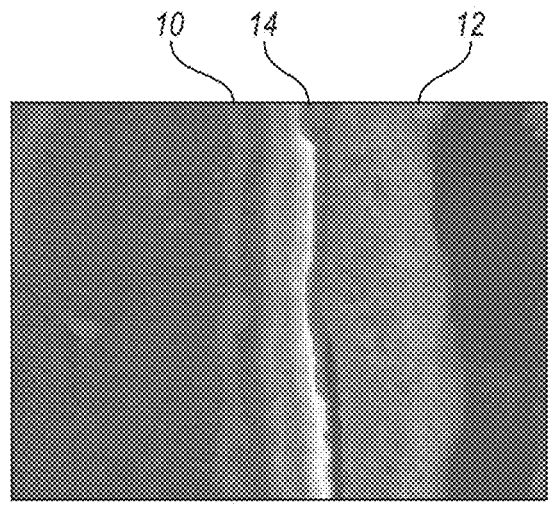
FIG. 1A depicts a scanning electron microscope (SEM) image of an anode, a cathode and a membrane extending therebetween in a pristine format before aging.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Polymer electrolyte fuel cell (PEFC) technology has been commercialized for fuel cell vehicle applications. Preventing mass market penetration of this technology is the cost and degradation of the expensive catalyst, typically platinum (Pt) or alloys thereof.

One major catalyst degradation phenomenon observed is the loss of electro-catalyst nanoparticle's electrochemically active surface area (ECSA) due to particle size growth from coalescence and/or dissolution-precipitation. Associated with this process, it is also commonly observed that a platinum band forms within the membrane near the interface between the cathode and the membrane or at the interface.

Figure 1B:
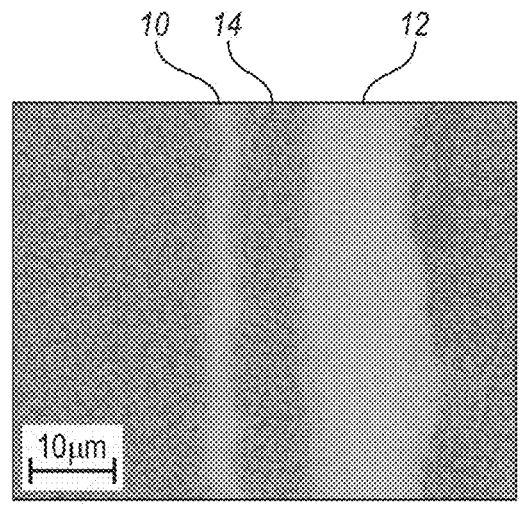
FIG. 1B depicts an energy dispersive spectroscopy (EDS) mapping image of platinum (Pt) in the anode, the cathode, and the membrane in the pristine format before aging.
Figure 1C:
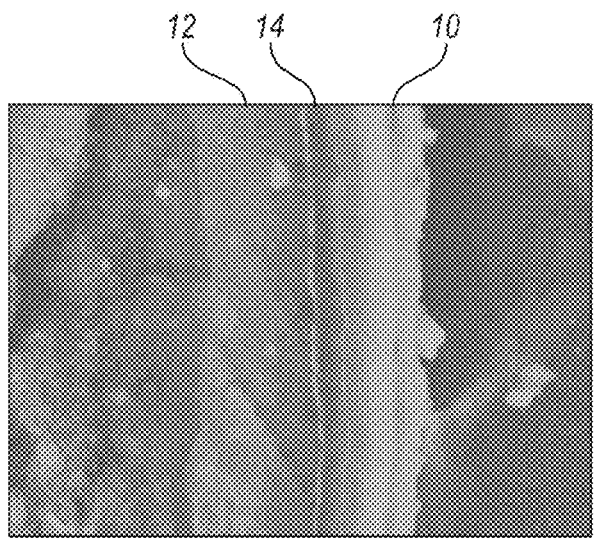
FIG. 1C depicts an SEM image of the anode, the cathode, and the membrane after aging.
Figure 1D:
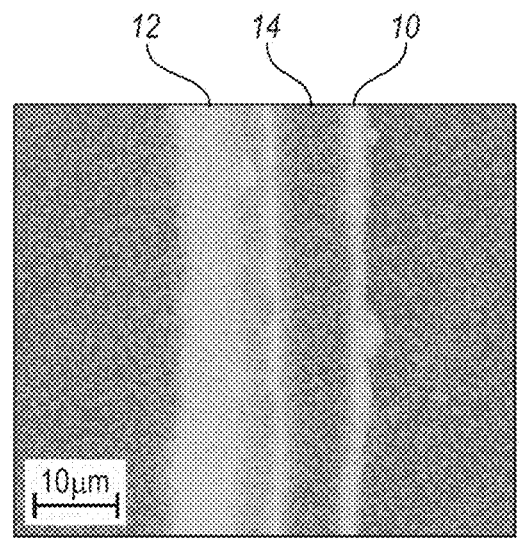
FIG. 1D depicts an EDS mapping image of Pt in the anode, the cathode, and the membrane after aging.

FIG. 1A depicts a scanning electron microscope (SEM) image of anode 10, cathode 12 and membrane 14 extending therebetween in a pristine format before aging. FIG. 1B depicts an energy dispersive spectroscopy (EDS) mapping image of platinum (Pt) in anode 10, cathode 12, and membrane 14 in the pristine format before aging. As shown by FIG. 1B, there is no Pt band in cathode 12. Rather, the Pt is homogeneously distributed throughout cathode 12. FIG. 1C depicts an SEM image of anode 10, cathode 12, and membrane 14 after aging. FIG. 1D depicts an EDS mapping image of Pt in anode 10, cathode 12, and membrane 14 after aging. As shown in FIG. 1D, cathode 12 includes a Pt band surface layer 18 and an electrically isolated Pt inner band 16 representing a Pt depleted region below the Pt band surface layer 18.

The electrically isolated Pt band is no longer catalytically active for electrochemical cell operation (e.g., fuel cell operation) and may impact the long-term stability of neighboring components within the electrochemical cell. For example, the electrically isolated Pt band may promote radical formation and/or the decomposition of hydrogen peroxide. Radical formation may be detrimental for membrane durability while decomposition of hydrogen peroxide is considered benign for the membrane. Prevention or mitigation of this degradation mechanism is desired to extend the service life of electrochemical cells and to deliver electrochemical cell performance.

As shown in FIGS. 1A and 1B, cathode 12 includes a homogeneous catalyst layer before use. When degradation occurs, a Pt band follows at the interface between cathode 12 and membrane 14 and a mass of Pt within the band is irreversibly lost from the catalyst layer. Consequently, the loss of Pt mass inside the catalyst layer leads to the Pt depleted region 18 within the catalyst as shown in FIGS. 1C and 1D. The location of the Pt band between cathode 12 and anode 10 may be governed by the crossover potential of $H_2$ and $O_2$ gas, which have limited but finite diffusivity in the membrane 14.

Avoiding Pt band formation and mitigating the Pt mass loss within the catalyst layer (e.g., cathode catalyst layer) has a potential to extend the lifetime of the fuel cell and other electrochemical cells, and therefore lower the life cycle cost of electrochemical cells. This is particularly important for application in stationary generation and transportation as the service life is designed to be greater than 5,000 hours.

Figure 2A:
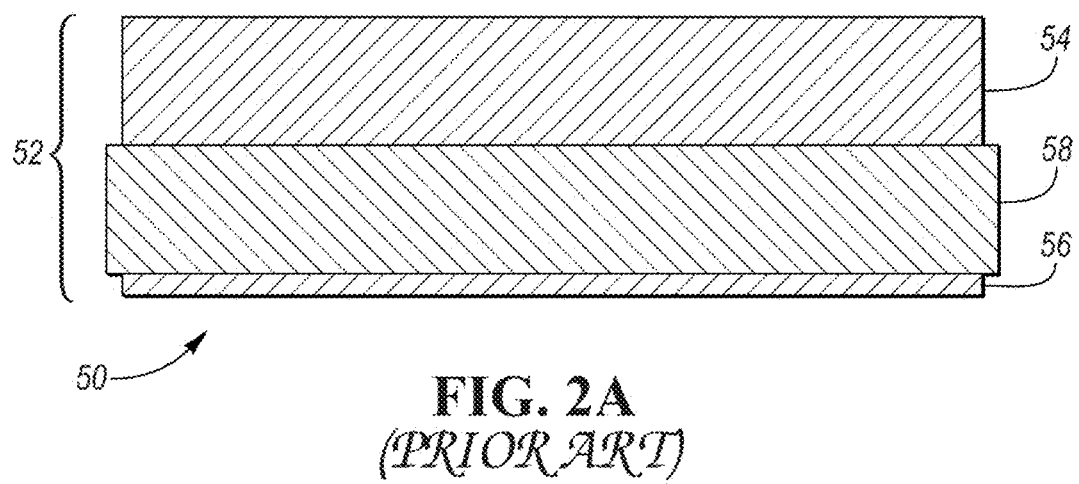
FIG. 2A depicts components of a prior art fuel cell.

FIG. 2A depicts components of a prior art fuel cell 50. Fuel cell 50 includes membrane electrode assembly (MEA) ↑configured to help produce an electrochemical reaction to separate electrons. Membrane electrode assembly 52 includes fuel cell subcomponents such as cathode layer 54, anode layer 56 and electrolyte membrane 58 (e.g., proton conductive ionomer or ionomer membrane) separating cathode layer 54 and anode layer 56. Besides MEA 52, fuel cell 50 may include other components such as current collectors, gas diffusion layers, gaskets, and bipolar plates.

The anode performs the hydrogen oxidation reaction (HOR) (1) while the cathode performs the oxygen reduction reaction (ORR) (2):

$$H_2 \rightarrow 2H^+ + 2e^{-s} \tag{1}$$

$$4H^+ + O_2 + 4e^- \rightarrow 2H_2O \tag{2}$$

Generally, the $H_2$ is broken down on the surface of the electrocatalyst in the anode to form protons and electrons in a HOR. The electrons are transported through the support of the anode catalyst layer to the external circuit while the protons are pulled through the proton exchange membrane to the cathode catalyst layer. Once in the cathode catalyst layer, the protons move through the ion-conducting polymer or ionomer thin-film network to the electrocatalyst surface, where they combine with the electrons from the external circuit and the $O_2$ that has diffused through the pores of the cathode catalyst layer to form water in the ORR.

Electrolyzers present another type of electrochemical cell. Electrolyzers use electrical energy to conduct chemical reactions. Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and cathode of the electrolyzer. Electrolyzers may be utilized in applications including industrial, residential, and military applications and technologies focus on energy storage such as electrical grid stabilization from dynamic electrical sources including turbines, solar cells, or localized hydrogen production.

A typical single electrolyzer is composed of an electrolyte membrane, an anode layer, and a cathode layer separated from the anode layer by the electrolyte membrane. An electrolyzer stack includes individual electrolyzer cells, each of which includes a membrane, electrodes, and bipolar plates. A catalyst material, such as Pt-based catalysts, is included in the anode and cathode layers of the electrolyzer stack. At the anode layers, $H_2O$ is hydrolyzed to $O_2$ and $H^+$ ($2H_2O \rightarrow O_2 + 4H^+ + 4e^-$). At the cathode layers 36, $H^+$ combines with electrons to form $H_2$ ($4H^+ + 4e^- \rightarrow 2H_2$).

During electrolysis, water is broken down into oxygen and hydrogen in anodic and cathodic electrically driven evolution reactions. Each electrode includes a porous transportation layer (PTL) and a catalyst layer. The reactant liquid water ($H_2O$) permeates through the anode PTL to the anode catalyst layer, where the oxygen evolution reaction (OER) occurs. The protons ($H^+$) travel via the membrane, and electrons (e-) conduct through an external circuit during the hydrogen evolution reaction (HER) at the cathode 36 catalyst layer. The anodic OER requires a much higher overpotential than the cathodic HER. It is the anodic OER which determines efficiency of the water splitting due to the sluggish nature of its four-electron transfer.

Electrocatalysts play a crucial role in the electrochemical cells as they enable the HOR, HER, ORR, and OER reactions. Electrocatalysts are typically included in a form of particles. To increase their stability and prevent their loss via dissolution or detachment, the catalysts may be attached to a support. The most frequently used catalysts are noble metals such as platinum (Pt), palladium (Pd), iridium (Ir), ruthenium (Ru), their alloys with metals such as cobalt (Co), nickel (Ni), copper (Cu), iron (Fe), manganese (Mn), molybdenum (Mo), their oxides and any combination thereof. The support may typically include carbon, metals, metal oxides, or their combination.

Electrocatalyst durability in electrochemical processes is a topic of great interest to guarantee stable performance of the electrochemical cells and devices. For example, stability of Pt nanoparticles (NPs) in fuel cells is a major technological challenge for fuel cell commercialization. Pt dissolution is typically observed when fuel cell operation is cycled into oxide formation voltage (e.g., greater than 0.9 Volts).

Carbon-supported platinum is currently the most widely used electrocatalysts in fuel cells and is a major contributor to fuel cost. Despite its maturity and improved performance, lifetime, and stability of fuels are greatly limited by the catalyst corrosion and degradation processes occurring on the surface of the catalyst, resulting in mass loss, structural evolution, and/or reduction in catalytically electrochemical active surface area (ECSA) (e.g., a formation of an electrically disconnected Pt band as described above).

In one or more embodiments, a bilayer electrocatalyst structure for an electrochemical cell is disclosed. The bilayer electrocatalyst structure of one or more embodiments includes an electrically connected functional layer disposed between a polymer electrolyte layer and a cathode layer. The functional layer may have a lower concentration of Pt catalyst particles than the cathode layer. In one or more embodiments, the functional layer may have no Pt particles. The functional layer may behave has a scavenger layer. The functional layer may be configured to mitigate or prevent the formation of an electrically disconnected catalyst (e.g., Pt) band in the membrane or at the interface between the membrane and the catalyst layer. In one or more embodiments, an isolated and electrically disconnected Pt band is not present after a threshold number of hours of service (e.g., an aged fuel cell). The threshold number of hours may be 4,000, 5,000 or 6,000 hours.

The functional layer may be separate and discrete from the anode catalyst layer, the cathode catalyst layer, and the electrolyte membrane layer such that the contents of the functional layers do not commingle with the contents of the anode catalyst layer, the cathode catalyst layer, or the electrolyte layer upon fabrication of the MEA of the electrochemical cell.

In one or more embodiments, an electrochemical cell including a functional layer disposed at an interface between an electrolyte layer and cathode layer is disclosed. The functional layer may include or be a composition including a carbon material, an ionomer material, and optionally an amount of catalyst material. The amount of catalyst material by weight to the amount of carbon material by weight may be any of the following values or in a range of any two of the following values: 0, 1, 2, 3, 4, 5, 6, 7, 8, 9, or 10 percent. The carbon material may be graphitized carbon, porous carbon, graphite, Vulcan, or a combination thereof. The carbon material (e.g., graphitized carbon, porous carbon, or a combination thereof) may be or includes a high surface area. The high surface area may have any of the following values or be in a range of any of the two following values: 500, 1,000, 1,500, 2,000, 2,500, 3,000, and 3,500 $m^2\ g^{-1}$. The ionomer material may be a Nafion ionomer, a high oxygen permeability ionomer (HOPI), or a combination thereof. The catalyst material may be a noble metal, platinum, palladium, alloys of Pt or Pd with metals such as Co, Ni, Cu, Mn, Fe, Mo, or combination thereof.

The ionomer material in the functional layer may include one or more ionomers that have a similar chain length or shorter-chain length than the ionomers used in the cathode catalyst layer.

The functional layer may have an ionomer material to a carbon material ratio that is equal to or greater than an ionomer material to a carbon material ratio in the cathode layer to provide adequate proton transport. The functional layer ionomer material to carbon material ratio may any of the following ratios or be in a range of any two of the following ratios: 0.2, 0.3, 0.4, 0.5, 0.6, 0.7, 0.8, 0.9, 1.0, 1.1, 1.2, 1.3, and 1.4.

The ionomer material may include or be a high equivalent weight (EW) structure configured to prevent or mitigate conductivity losses. The high EW of the ionomer material may be any of the following or in a range of any two of the following: 800, 850, 900, 950, 1,000, 1,050, and 1,100 g/mol.

The functional layer may be any of the following thickness or in a range of any two of the following thicknesses: 1, 1.5, 2, 2.5, 3, 3.5, 4, 4.5, 5, 5.5, 6, 6.5, 7, 7.5, 8, 8.5, 9, 9.5, and 10 μm. The functional layer thickness (e.g., before being put into use) may be thicker than a catalyst band formed in a cathode layer after aging (e.g., Pt band surface layer 18). The functional layer thickness (e.g., before being put into use) may be thinner than a catalyst depletion region observed if a catalyst band forms (e.g., electrically isolated Pt inner band 16).

The thickness of the functional layer may be optimized based on one or more of the expected operating conditions of the electrochemical cell. For instance, with respect to a fuel cell, the expected operating conditions may include temperature, relative humidity, gas concentrations, and/or membrane chemistry.

The functional layer may have a lower porosity than the porosity of the cathode layer. The porosity of the functional layer may be any of the following porosities or in a range of 0, 5, 10, 15, 20, 25, and 30% porosity.

In one or more embodiments, a method of fabricating an electrochemical cell is disclosed. The method may include depositing a film layer on an electrolyte membrane to form a film layer. The film material may include a carbon material, an ionomer material, and optionally a catalyst material. The method may further include curing the film layer to form a functional layer having a first surface and an opposing second surface. The first surface of the functional layer may contact the electrolyte membrane. The method may further include depositing a cathode material on the opposing second surface to form a cathode layer. The electrolyte membrane layer, the functional layer, and the cathode layer form a portion of the electrochemical cell. Alternatively, the fabrication process may include transferring a first decal onto an electrolyte membrane layer and transferring a second decal onto the functional layer to form the cathode layer.

In one or more embodiments, an electrochemical cell including a functional layer disposed at an interface between an electrolyte layer and cathode layer is disclosed. The functional layer may include or be a composition including a carbon material, an ionomer material, a filler material, and optionally an amount of catalyst material. The ionomer material may be a first polymeric material. The filler material may be a second polymeric material. The first and second polymeric materials may be the same polymeric material. Alternatively, the first and second polymeric materials may be different polymeric materials. The filler material may be configured/selected to decompose after a threshold number of hours of operation of a fuel cell. The threshold number of hours of operation of the fuel cell may be 300, 400, or 500 hours. The decomposition of the filler material allows for the functional layer to become an active layer using the catalyst that was deposited within the functional layer during previous operation.

The functional layer may be electrically isolated from the anode catalyst layer and/or the cathode catalyst layer. The functional layer may be connected to an external voltage source. During operation of the fuel cell in a normal operating mode, catalyst material from the cathode catalyst layer dissolves and may deposit within the functional layer. During operation of the fuel cell in a recovery mode, the potential of the functional layer is modulated using an externally applied potential to dissolve the catalyst material that was deposited. The dissolved catalyst material is then redeposited on the cathode catalyst layer by holding the cathode catalyst layer at a low potential (e.g., less than 0.6 V) using the external voltage source.

Figure 2B:
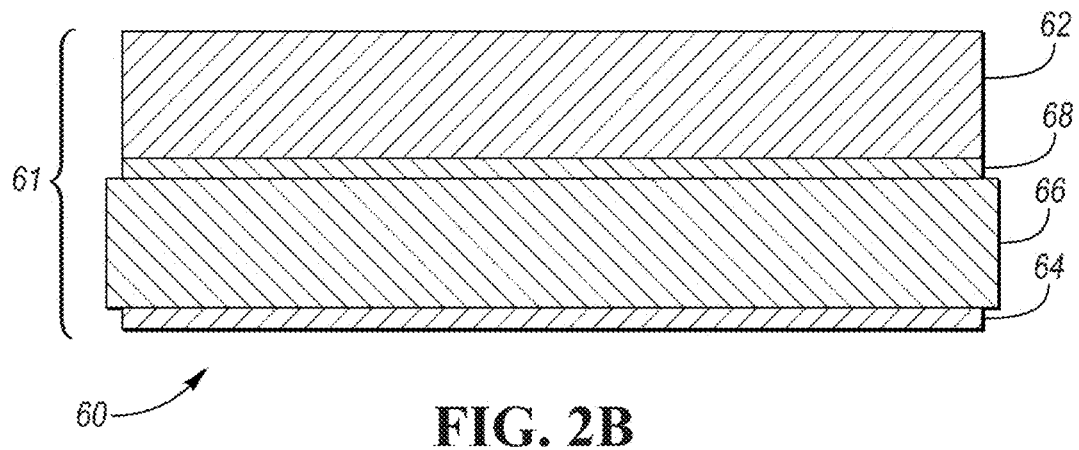
FIG. 2B depicts components of a fuel cell of one or more embodiments.

FIG. 2B depicts components of a fuel cell 60 according to one or more embodiments. Fuel cell 60 includes MEA 61 configured to help produce an electrochemical reaction to separate electrons. MEA 60 includes cathode layer 62, anode layer 64, and electrolyte membrane 66 separating cathode layer 62 and anode layer 64. Fuel cell 60 also includes functional layer 68 at an interface between electrolyte membrane 66 and cathode layer 62.

Figure 3A:
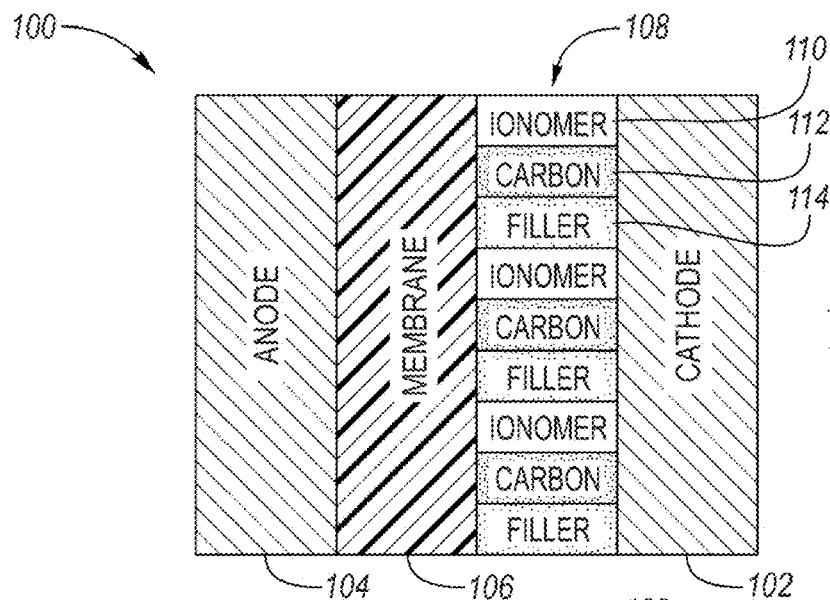
FIG. 3A depicts a schematic view of a fuel cell including a cathode layer, an anode layer, and an electrolyte membrane separating the cathode layer and the anode layer.

FIG. 3A depicts a schematic view of fuel cell 100 including cathode layer 102, anode layer 104, and electrolyte membrane 106 separating cathode layer 102 and anode layer 104. Fuel cell 100 also includes functional layer 108 at an interface between electrolyte membrane 106 and cathode layer 102. As shown in FIG. 3A, functional layer 108 includes ionomer material 110, carbon material 112, and filler material 114. As shown in FIG. 3A, functional layer 108 does not include any catalyst material. FIG. 3A depicts fuel cell 100 at the beginning of life (BOL) of fuel cell 100. Carbon material 112 is in electrical contact with cathode layer 102 and is insulated from anode layer 104 by electrolyte membrane 106.

Figure 3B:
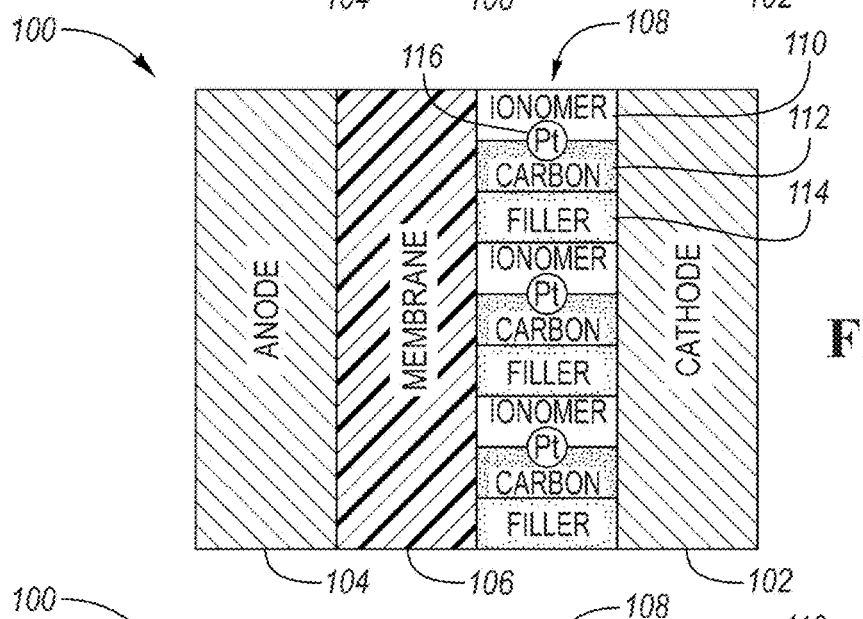
FIG. 3B depicts a schematic view of a fuel cell during operation of the fuel cell according to one embodiment.

FIG. 3B depicts a schematic view of fuel cell 100 during operation of fuel cell 100 according to one embodiment. During operation of fuel cell 100, catalyst material 116 (e.g., Pt catalyst material) dissolves from cathode layer 102 and redeposits in functional layer 108.

Figure 3C:
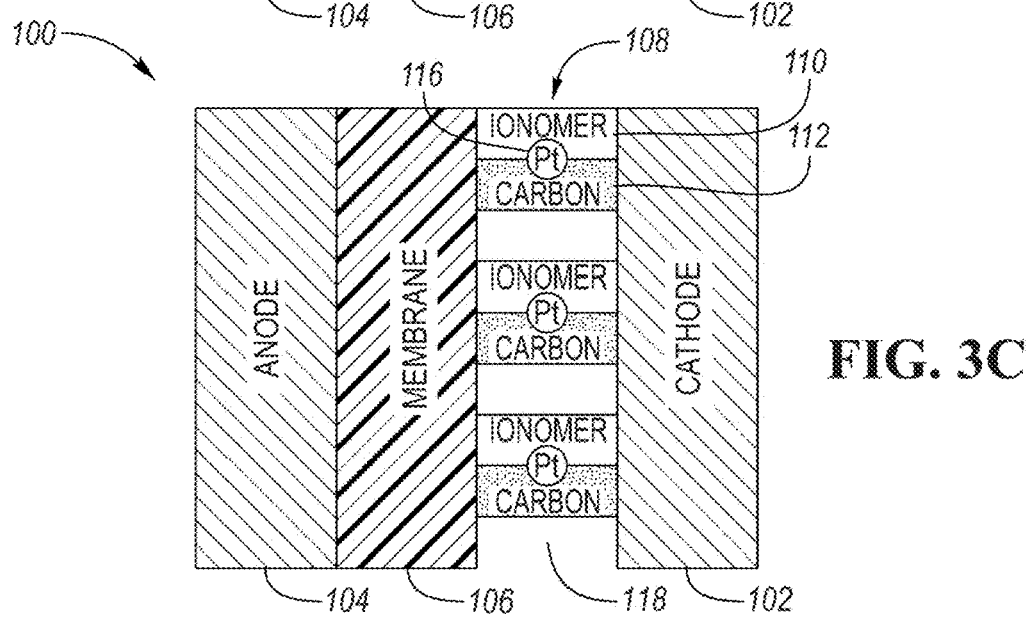
FIG. 3C depicts a schematic view of the fuel cell of FIGS. 3A and 3B showing degradation of a filler material in a functional layer at an interface between the cathode layer and the electrolyte membrane.

FIG. 3C depicts a schematic view of fuel cell 100 showing degradation of filler material 114 in functional layer 108. The degradation of filler material 114 creates pathways 118 with high $O_2$ permeability in functional layer 108. Catalyst material (e.g., Pt catalyst material) present in functional layer 108 can be used for ORR during fuel cell operation.

FIG. 4 depicts experimental samples of fuel cells including functional layers. FIGS. 4A1, 4B1, and 4C1 depict schematic views of fuel cells 150, 152, and 154 according to experimental samples.

Fuel cell 150 includes anode layer 156, cathode layer 158, and electrolyte membrane 160. Fuel cell 150 further includes functional layer 162 disposed at an interface between cathode layer 158 and electrolyte membrane 160. The amount of platinum catalyst to carbon in cathode layer 158 is 40% Pt/C by weight. The amount of platinum catalyst to carbon in functional layer 162 is 10% Pt/C by weight. Fuel cell 152 includes anode layer 164, cathode layer 166, and electrolyte membrane 168. Fuel cell 120 further includes functional layer 170 spaced apart from electrolyte membrane 160 by cathode layer 158. The amount of platinum catalyst to carbon in cathode layer 166 is 40% Pt/C by weight. The amount of platinum catalyst to carbon in functional layer 170 is 10% Pt/C by weight. Fuel cell 154 includes anode layer 172, cathode layer 174, and electrolyte membrane 176. Fuel cell 154 does not include a functional layer.

Fuel cells 150, 152, and 154 were fabricated in a laboratory as proof-of-concepts samples. The samples were subjected to laboratory accelerated aging protocols. FIGS. 4A2, 4B2, and 4C2 depict SEM images of fuel cells 150, 152, and 154, respectively, after lab-accelerated aging protocols. FIGS. 4A3, 4B3, and 4C3 depict EDS mapping images of platinum (Pt) in fuel cell 150, 152, and 154, respectively, after laboratory accelerated aging protocols. Fuel cell 150 is an example of a fuel cell construction according to one or more embodiments. Fuel cell 152 is first control sample where the functional layer is not interfaced with the electrolyte membrane but is on top of the cathode layer. Fuel cell 154 is a second control sample where there is no functional layer.

After laboratory accelerated aging protocols, there was no clear signal indicating significant Pt band formation in fuel cell 150. In comparison, in first control sample and second control sample, a clearly visible Pt band is formed and observed at the membrane and cathode catalyst layer interface, indicative of severe aging of the cathode catalyst layer. This experimental result suggest that the low Pt (or no Pt) content functional layer positioned in between the membrane and cathode catalyst layer can prevent or mitigate the formation of Pt band, thereby extending the operation life of the fuel cell.

Figure 5B:
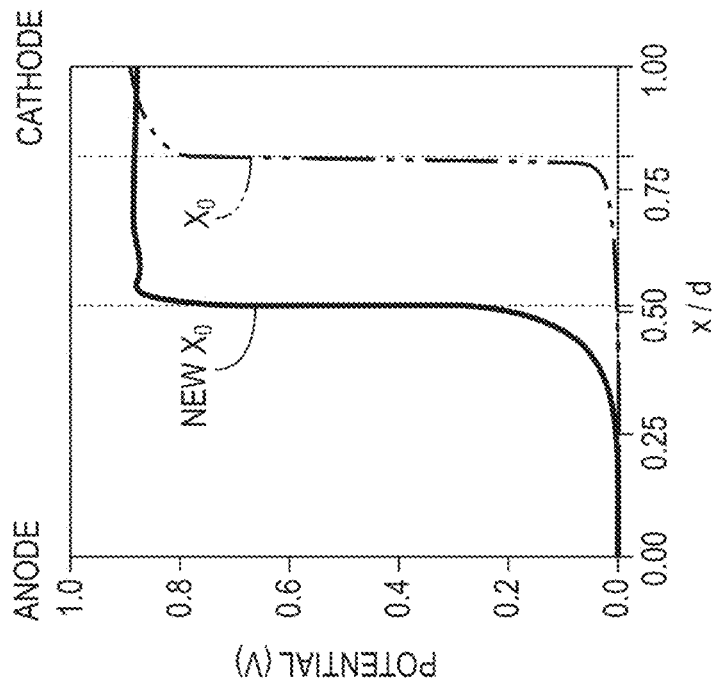
FIG. 5B depicts representative potential curves for a fuel cell membrane in two different configurations: (a) where there is no functional layer, and (b) where there is a functional layer according to one embodiment.
Figure 5A:
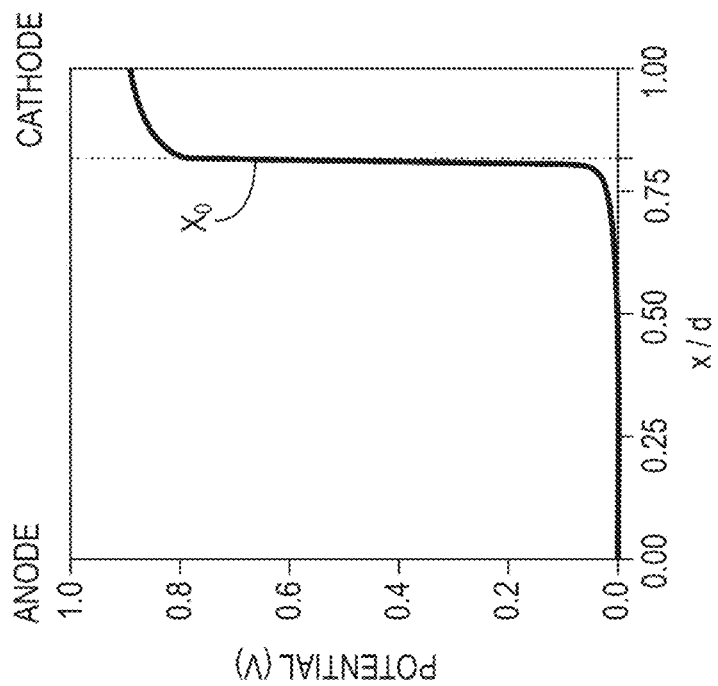
FIG. 5A depicts a representative potential curve for a fuel cell membrane in a configuration where there is no functional layer.

The formation of a Pt band in a fuel cell membrane is understood to be a result of the reduction of dissolved Pt species which diffuse away from the cathode. The location of the Pt band is determined by the location closest to the cathode at which the potential in the membrane is sufficiently low to reduce the dissolved Pt. The potential in the membrane can be described by an electrochemical model combining hydrogen and oxygen diffusivity in the membrane, as well as their electrochemical interaction with Pt such as exchange current. FIG. 5A is a representative potential curve for a fuel cell membrane in a configuration where there is no functional layer. FIG. 5B depicts representative potential curves for a fuel cell membrane in two different configurations: (a) where there is no functional layer, and (b) where there is a functional layer according to one embodiment. In connection with FIGS. 5A and 5B, d equals 27.5 μm is the membrane thickness.

The potential is characterized by a large step change at position $x_0$. $x_0$ represents a physical position into the catalyst layer of a fuel cell where the electrochemical potential of the cell drops. This physical location corresponds to the location of the Pt band. The location of this potential step is given by equation (3) set forth below.

$$x_0 = \frac{H_{H_2} D_{H_2} c^0_{H_2}}{H_{H_2} D_{H_2} c^0_{H_2} + 2 H_{O_2} D_{O_2} c^0_{O_2}} \quad (3)$$

where H is the Henry's coefficient of $H_2$ or $O_2$ in the membrane, D is the diffusivity of $H_2$ or $O_2$ in the membrane, and $c^0$ is the concentration of $H_2$ or $O_2$ at the cathode and anode respectively. We assume $H_{H_2} D_{H_2} = 3.6 \times 10^{-7}$ cm$^2$ s$^{-1}$ and $H_{O_2} D_{O_2} = 2.0 \times 10^{-7}$ cm$^2$ s$^{-1}$ following and $c_{H_2}^0 = 1$, $c_{O_2}^0 = 0.21$ based on the experimental conditions.

Following equation (3), the electrically connected functional layer extends from a cathode catalyst layer to at least a distance of $x_0$ into the membrane, which is determined by the expected fuel cell operating conditions (e.g., gas concentrations, temperature, relative humidity, and/or choice of membrane). In this configuration, any reduced Pt is deposited in the electrically connected functional layer, where it may continue to be catalytically active and contribute to PEFC operation.

The membrane electrode assemblies were fabricated using Nafion XL polymer membranes purchased from ion power, with polytetrafluoeoethylene (PTFE) reinforced 27.5 μm thickness. Prepared inks were hot pressed on the membrane at 1.1 KN/m² for 3 minutes at 150° C. Two inks were prepared from electro catalyst powders with different carbon contents (e.g., 40 wt. % Pt/Vulcan and 10 wt. % Pt/Vulcan-type-C HiSPEC). The inks were designed to have a density of 35 mg$_{solid}$/mlit$_{sol}$. The MEA loadings were calculated by subtracting the weight of the decal before and after hot pressing using the Pt content calculated from the density of the ink. The MEAS were designed to have an overall loading of ~0.4 mg$_{Pt}$/cm²$_{geo}$ on cathode side and ~0.1 mg$_{Pt}$/cm²$_{geo}$ on the anode side.

Two aging protocols were performed on the MEAS, which started from 30,000 cycles of square wave load/unload potential cycling at 0.6 V and 1 V with a potential hold of 2 s at each point. This protocol was followed by 1000 cycles of a triangular wave potential scanning from 1 V to 1.5 V at 500 mV/s scan rate. The above-mentioned protocols were performed at 100° C. and 100% RH. Characterizations (including capacitance-voltage (CV), linear sweep voltammetry (LSV) and electrochemical impedance spectroscopy (EIS) (under $H_2/N_2$) and polarization curves (under $H_2$/Air)) were performed at different cycle numbers to evaluate the effect of the aging on the MEAs and to finally investigate the Pt band formation on the membranes.

The following application is related to the present application: U.S. patent application Ser. No. 17/842,258 (RBPA 0402PUS), filed on Jun. 16, 2022, which is incorporated by reference in its entirety herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical cell comprising:
   an anode layer;
   a cathode layer;
   an electrolyte membrane layer disposed between and spacing apart the anode layer and the cathode layer; and
   a functional layer disposed at an interface between the cathode layer and the electrolyte membrane layer, the functional layer including a composition including a carbon material and an ionomer material, the functional layer has a thickness of 6 to 10 μm.

2. The electrochemical cell of claim 1, wherein the carbon material includes a high surface area in a range of 500 to 3,500 m²g$^{-1}$.

3. The electrochemical cell of claim 2, wherein the carbon material is graphitized carbon, porous carbon, or a combination thereof.

4. The electrochemical cell of claim 1, wherein a ratio of the ionomer material to the carbon material in the functional layer is in a range of 0.2 to 1.4.

5. The electrochemical cell of claim 1, wherein the ionomer material includes a high equivalent weight (EW) structure having an EW of 800 to 1,100 g/mol.

6. The electrochemical cell of claim 1, wherein the functional layer has a thickness of 8 to 10 µm.

7. The electrochemical cell of claim 1, wherein the functional layer has a porosity of 0 to 30% porosity.

8. The electrochemical cell of claim 1, wherein the cathode layer includes a cathode ionomer material, and the ionomer material of the functional layer has a similar chain length or shorter-chain length than the cathode ionomer material.

9. The electrochemical cell of claim 1, wherein the electrochemical cell is a fuel cell.

10. An electrochemical cell comprising:
an anode layer;
a cathode layer;
an electrolyte membrane layer disposed between and spacing apart the anode layer and the cathode layer; and
a functional layer disposed at an interface between the cathode layer and the electrolyte membrane layer, the functional layer including a composition including a carbon material, an ionomer material, and a filler material, the functional layer has a thickness of 6 to 10 µm.

11. The electrochemical cell of claim 10, wherein the ionomer material is a first polymeric material and the filler material is a second polymeric material.

12. The electrochemical cell of claim 11, wherein the first and second polymeric materials are the same polymeric material.

13. The electrochemical cell of claim 11, wherein the first and second polymeric materials are different polymeric materials.

14. The electrochemical cell of claim 10, wherein the filler material is configured to decompose after a threshold number of hours of operation of the electrochemical cell to form pathways for oxygen transport.

15. A method of fabricating an electrochemical cell, the method comprising:
providing a functional layer on an electrolyte membrane layer, the functional layer having a first surface and an opposing second surface, the first surface of the functional layer contacting the electrolyte membrane layer, the functional layer including a carbon material, and an ionomer material, the functional layer has a thickness of 6 to 10 µm; and
providing a cathode material on the opposing second surface of the functional layer to form a cathode layer, and the electrolyte membrane layer, the functional layer, and the cathode layer forming a portion of the electrochemical cell.

16. The method of claim 15, wherein the first providing step includes depositing a film material on the electrolyte membrane layer to form a film layer, and curing the film layer to form the functional layer.

17. The method of claim 15, wherein the first providing step includes transferring a first decal onto the electrolyte membrane layer to form the functional layer.

18. The method of claim 15, wherein the second providing step includes transferring a second decal onto the opposing second surface of the functional layer to form the cathode layer.

19. The electrochemical cell of claim 1, wherein the functional layer is separate and discrete from the cathode layer.

20. The electrochemical cell of claim 19, wherein the functional layer does not commingle with contents of the cathode layer upon fabrication of the cathode layer.

* * * * *